United States Patent Office 2,737,525
Patented Mar. 6, 1956

2,737,525

TRICARBOXYLIC ACID ESTERS

John F. Mulvaney, Berkeley Heights, N. J., and James G. Murphy, Cold Spring, N. Y.

No Drawing. Application November 13, 1951,
Serial No. 256,158

2 Claims. (Cl. 260—481)

The present invention relates to new and useful esters of carboxymethylmercapto succinic acid.

Objects and advantages of the invention will be set forth in part hereinafter and in part will be obvious herefrom, or may be learned by practice with the invention, the same being realized and attained by means of the steps, compositions, combinations and improvements pointed out in the appended claims.

The invention consists in the novel strip, compositions, combinations and improvements herein described.

Specifically the invention is directed to compounds of the formula

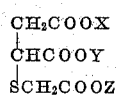

wherein X, Y and Z are hydrogen atoms or alkyl radicals with at least one of said X, Y or Z groups being an alkyl radical, the total number of alkyl radical carbon atoms in said compound being at least 8.

An object of the present invention is to provide new esters of carboxymethylmercapto succinic acid which are particularly useful as plasticizers for synthetic resins and which impart low brittleness temperature to said resins.

A further object of the invention is to provide new esters which have extreme pressure properties in lubricating oils.

A further object of our invention is to provide new esters which are surface active agents and anti-oxidant properties.

As can be seen from the formula stated above, the esters may be tri, di and monoesters. The tri esters within the scope of this invention are the esters in which the total number of carbon atoms is between 8 and 36 with the preferred range between 12–24. Among the tri esters of carboxymethylmercapto succinic acid which are operable are carboxymethylmercapto tri-n-butyl succinate, carboxymethylmercapto tri-n-propyl succinate, carboxymethylmercapto tri-n-hexyl succinate, carboxymethylmercapto tri 2-ethyl-hexyl succinate, carboxymethylmercapto tri-n-octyl succinate, carboxymethylmercapto tri-n-decyl succinate and carboxymethylmercapto tri-n-dodecyl succinate. These esters are exceptionally good plasticizers, being superior in many respects to the commonly used plasticizers such as dibutyl and dioctylphthalates, dibutylsebacate and tricresylphosphate. For example, if a vinyl resin is plasticized with dioctylphthalate, the brittleness temperature is −40° F. If the vinyl resin is plasticized with tributyl carboxymethylmercapto succinic acid, the brittleness temperature is −70° F. which is a far superior result from the prior dioctyl phthalate plasticizer. The triesters of this invention exhibit good color and odor and have excellent heat stability and low volatility as well as excellent mechanical properties. In tensile strength, modulus, elongation, stability to heat and light and various other properties important to a critical evaluation of any plasticizer, the triesters of this invention are in all these respects equal to and in many respects far superior to the commonly used phthalate, sebacate and phosphate esters. Besides having excellent plasticizing properties, these triesters are also useful as extreme pressure additives in lubricants and can also be used as hydraulic fluids. In hydraulic fluids, their mobility at low temperatures is valuable for special low temperature applications.

Diesters of carboxymethylmercapto succinic acid in which the total number of alkyl carbon atoms is between 8 and 28 are within the scope of this invention with the preferred esters having their total number of alkyl carbon atoms between 12–24. Among the diesters contemplated by this invention are carboxymethylmercapto dibutyl succinate, carboxymethylmercapto di-2-ethylhexyl succinate, carboxymethylmercapto di-n-octyl succinate, carboxymethylmercapto di-n-decyl succinate and carboxymethylmercapto di-n-dodecyl succinate.

Monoesters of carboxymethylmercapto succinic acid in which the total number of alkyl carbons is between 8 and 18 are also part of this invention. Examples of such monoesters which are operable are carboxymethylmercapto octyl succinate, carboxymethylmercapto lorol succinate (lorol alcohol is a mixed alcohol predominately of $C_{12}$ carbon atoms and is a mixed coconut oil fatty alcohol), carboxymethylmercapto decyl succinate, carboxymethylmercapto dodecyl succinate and carboxymethylmercapto octadecyl succinate.

The mono and diesters of this invention are useful intermediates in the preparation of modified resins. Depending upon whether mono or diesters are selected, one or two reactive functional groups are available for polymerization, especially with polyfunctional alcohols to produce alkyd type resins.

Metallic salts of the mono and diesters are extremely useful. For example, the sodium, calcium, barium, lead, cobalt, manganese, copper, cadmium and nickel salts of carboxymethylmercapto di-2-ethylhexyl succinate are all liquid, which increases the utility of these salts. The salts of the mono and diesters are useful as surface active agents, paint driers, mildew proofing agents, vinyl resin stabilizers, oil additives and catalysts. In the cases of paint driers, mildew proofing agents, oil additives and catalysts, the liquid state of the metallic salts permits uniform dispersion of the metallic derivatives. In the cases of vinyl resin stabilizers and oil additives, protective action is secured from the antioxidant effect of the thioether sulfur present in the carboxymethylmercapto succinic acid esters. In regard to the salts of the mono and diesters as surface active agents, the compounds are useful as emulsifying, wetting, dispersing or foaming agents and the like.

The triesters are prepared by direct esterification of carboxymethylmercapto succinic acid with the desired alcohol. Acid esterification catalysts such as hydrogen chloride, sulfuric acid, benzene sulfonic acid and the like may be employed. In general it is convenient to employ also a water entraining agent such as carbon tetrachloride, benzene, or toluene to remove the water of reaction as soon as formed.

It is to be emphasized that the mono and diesters are more difficult to prepare than the triesters. It is extremely difficult to prepare a tricarboxylic acid in which only one or two of the three available carboxyl groups are esterified. In a few instances such compounds are obtained in very low yields, at high expense and after laborious effort only by such methods as partial hydrolysis under very carefully controlled conditions, of the fully esterified acid. In all such cases mixtures of mono, di and tri esters invariably result. The process used in preparing the mono and di esters is most efficient in that it embodies the preparation of such compounds by extremely simple techniques, in practically quantitative yield and at low cost.

The diesters are prepared in good yield by allowing thioglycolic acid to react with any desired diester of maleic acid preferably at a pH close to the neutral point. The reaction is rapid and practically quantitative even at room temperature.

The mono esters are produced simply and in excellent yield by permitting an ester of thioglycolic acid to react with a solution of maleic acid preferably at or close to the neutral point.

In general it is advantageous in the preparation of the mono and diesters to bring the reactants into more intimate contact by the use of a mutual solvent, thus producing a one phase system, resulting in a more rapid and more complete reaction.

In order to illustrate the invention more specifically, the following illustrative examples are given:

*Example I.—Carboxymethylmercapto-tri-n-propyl succinate*

624 gms. (3 moles) of carboxymethylmercaptosuccinic acid, 650 gms. (10.8 moles) of n-propanol, 300 gms. of benzene, and 3 gms. of concentrated sulfuric acid were mixed and refluxed until no more water collected in Dean-Stark trap (7⅓ hrs.). The ester solution was decolorized with charcoal, washed with sodium bicarbonate solution, water, and dried with sodium sulfate. After vacuum distillation of the toluene, obtained 839 gms. of crude ester; yield, 83.7%.

The pure ester distills at 125–131° C. at 0.08–0.10 mm.

*Example II.—Carboxymethylmercapto-tri-n-butyl succinate*

77 g. (0.37 mole) of carboxymethylmercaptosuccinic acid, 174.6 g. (2.36 moles) of butanol, 200 cc. of toluene, and 2 g. of p-toluenesulfonic acid were mixed and refluxed, collecting water in a Dean-Stark trap until no more distilled over (2¾ hours). The ester solution was washed with water; solvent was distilled off at atmospheric pressure, obtaining thereby, 144.5 g. of crude ester.

A pure fraction was obtained boiling at 161–163° at 0.20–0.22 mm.

Sp. G. 25/25=1.0517, $N_D^{25}$=1.4606.
$M_D$ Calc.=98.2, $M_D$ found=98.6.
Saponification number: Calcd. 448, found 455.

*Example III.—Tri-n-dodecyl ester*

One-quarter mole of carboxymethylmercapto succinic acid, 0.75 mole of n-dodecanol, 0.5 gm. of p-toluenesulfonic acid, and 75 cc. of toluene were combined and refluxed until no more water collected in the Dean-Stark trap. The resulting ester solution was washed with sodium bicarbonate solution and the toluene solvent was stripped off by distillation affording 185 gm. of the tri-n-dodecyl ester.

*Example IV.—Carboxymethylmercapto dibutyl succinate*

To 28.1 gms. of 81.83% thioglycolic acid (0.25 mole) sufficient 15% sodium hydroxide was added to bring the pH to 7.04. Butyl maleate (0.25) moles and 100 cc. of ethanol were then added. Within a few minutes the two layers became homogeneous and an exothermic reaction set in. Four hours later iodine titration showed the reaction to be 96% completed.

The reaction mixture was diluted with water and acidified. The oil which separated was washed with water and dried. Yield of crude ester 88%. Purity of crude ester by alkali titration 91.5%. By neutralization of this acid with sodium hydroxide, the sodium salt was obtained which could be purified by precipitation from methanol solution by ether. M. Pt. of Na Salt 148° C. uncorr.

Calcd. for $C_{14}H_{23}O_6SNa$ ---------- 9.37% S; 6.72% Na
Found ------------------------ 9.65% S; 6.39% Na
                               9.38% S; 6.59% Na

*Example V.—Carboxymethylmercapto di-2-ethylhexyl succinate*

Thioglycolic acid, 3 moles, was dissolved in 900 cc. of water and was neutralized with sodium hydroxide. 2-ethylhexyl maleate, 3 moles, and one liter of alcohol were added and the reaction was allowed to proceed to completion at room temperature. Three moles of hydrochloric acid were then added. The oil layer that formed was separated, washed with water and dried in vacuum affording 1136 g. of the diester.

*Example VI.—Carbododecoxymethylmercaptosuccinic acid*

To a neutralized solution of maleic acid (0.5 mole) in water, dodecyl thioglycolate (0.5 mole) and 700 cc. of alcohol were added. The mixture remained at room temperature for one week during which time the sodium salt of the reaction product gradually precipitated out. Titration showed the reaction to be 93% complete.

The sodium salt was purified by precipitation from water by means of acetone.

Calcd. for $C_{18}H_{30}O_6SNa_2$ ------------------ 7.62% S
Found ------------------------------- 7.32% S The invention in its broader aspects is not limited to the specific steps, compositions, combinations and improvements described but departures may be made therefrom within the scope of the accompanying claims without departing from the principles of the invention and without sacrificing its chief advantages.

This application is a continuation-in-part of application No. 764,914, filed July 30, 1947, and now abandoned.

We claim:
1. A chemical compound of the formula:

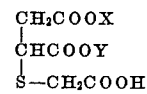

wherein X and Y are alkyl radicals, the total number of alkyl carbon atoms in said compound being from 8 to 28.

2. A compound of the formula as defined in claim 1 in which the total number of alkyl carbon atoms is from 12 to 24.

References Cited in the file of this patent
UNITED STATES PATENTS

| | | |
|---|---|---|
| 2,424,007 | Moore et al. | July 15, 1947 |
| 2,503,401 | Mattano et al. | Apr. 11, 1950 |
| 2,576,899 | Albrecht | Nov. 27, 1951 |
| 2,581,514 | Chilcote | Jan. 8, 1952 |

OTHER REFERENCES

Larson: "Chem. Abst." (1946), vol. 40, p. 2796.